United States Patent
Chang et al.

(10) Patent No.: US 9,953,122 B2
(45) Date of Patent: Apr. 24, 2018

(54) INTEGRATED CIRCUIT DESIGN METHOD AND ASSOCIATED NON-TRANSITORY COMPUTER-READABLE MEDIUM

(71) Applicant: TAIWAN SEMICONDUCTOR MANUFACTURING COMPANY LTD., Hsinchu (TW)

(72) Inventors: Yu-Jen Chang, Taichung (TW);
Kuo-Nan Yang, Hsinchu (TW);
Jui-Jung Hsu, Hsinchu (TW);
Chih-Hung Wu, Hsin-Chu (TW);
Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 15/210,052

(22) Filed: Jul. 14, 2016

(65) Prior Publication Data
US 2018/0018410 A1    Jan. 18, 2018

(51) Int. Cl.
*G06F 17/50* (2006.01)

(52) U.S. Cl.
CPC ........ *G06F 17/505* (2013.01); *G06F 17/5072* (2013.01); *G06F 17/5077* (2013.01); *G06F 17/5081* (2013.01); *G06F 2217/82* (2013.01); *G06F 2217/84* (2013.01)

(58) Field of Classification Search
CPC ............. G06F 17/5081; G06F 17/5072; G06F 17/5077; G06F 17/505; G06F 2217/81; G06F 2217/82; G06F 2217/84

USPC ........ 716/104, 106, 109, 111, 112, 120, 127, 716/133, 136; 703/16
See application file for complete search history.

(56) References Cited

U.S. PATENT DOCUMENTS

| | | | | |
|---|---|---|---|---|
| 4,175,253 A | * | 11/1979 | Pitegoff | G01R 27/14 324/537 |
| 5,581,475 A | * | 12/1996 | Majors | G06F 17/5081 716/112 |
| 8,468,482 B1 | * | 6/2013 | Pack | G06F 17/5036 716/110 |
| 8,601,416 B2 | | 12/2013 | Kuo et al. | |
| 8,762,900 B2 | | 6/2014 | Shin et al. | |
| 8,775,993 B2 | | 7/2014 | Huang et al. | |

(Continued)

*Primary Examiner* — Phallaka Kik
(74) *Attorney, Agent, or Firm* — WPAT, P.C., Intellectual Property Attorneys; Anthony King

(57) ABSTRACT

An integrated circuit (IC) design method is disclosed. The method includes: using a computer to perform synthesis upon a register transfer level (RTL) IC design to generate a gate level netlist; performing place and route (P&R) upon the gate level netlist to generate a layout; determining a sink current distribution information of the layout; and generating a voltage (IR) drop/electro-migration (EM) analysis result of the layout according to the sink current distribution information; wherein the layout includes a cell having a cell height that is N times higher than a single cell height, where N is an integer and greater than 1, and the cell corresponds to N power/ground (P/G) rail sets; wherein the sink current distribution information includes a proportion of a sink current flowing through each of the N power/ground (P/G) rail sets with respect to the cell when operated. Associated non-transitory computer-readable medium is also disclosed.

20 Claims, 6 Drawing Sheets

(56) References Cited

U.S. PATENT DOCUMENTS

| | | |
|---|---|---|
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 9,355,950 B1 * | 5/2016 | Bayerer ............ H01L 23/49833 |
| 2006/0054935 A1 * | 3/2006 | Takahata ............ G06F 17/5068 |
| | | 257/204 |
| 2010/0037191 A1 * | 2/2010 | Kosuge ............... G06F 17/5036 |
| | | 716/106 |
| 2011/0107283 A1 * | 5/2011 | Oh ...................... G06F 17/5068 |
| | | 716/107 |
| 2013/0055184 A1 * | 2/2013 | Shroff ................. G06F 17/5081 |
| | | 716/112 |
| 2014/0237435 A1 | 8/2014 | Chen et al. |
| 2014/0304670 A1 | 10/2014 | Su et al. |
| 2015/0278419 A1 | 10/2015 | Yang et al. |
| 2015/0347665 A1 * | 12/2015 | Sapatnekar ......... G06F 17/5081 |
| | | 716/115 |
| 2015/0370937 A1 | 12/2015 | Liu et al. |
| 2015/0370945 A1 | 12/2015 | Lee |

\* cited by examiner

US 9,953,122 B2

INTEGRATED CIRCUIT DESIGN METHOD AND ASSOCIATED NON-TRANSITORY COMPUTER-READABLE MEDIUM

BACKGROUND

Nowadays, a standardized cell from a cell library is used in circuit design. The standardized cell has either a cell height equal to the height of other cells in a same cell row, or has a cell height that is a multiple of a standard cell height. A cell having a single cell height is normally engaged to only one power/ground (P/G) rail set. However, especially for electro migration (EM) and voltage (IR) drop analysis, it becomes more complicated for. P/G rail planning when a cell having a cell height that is a multiple of the standard cell height.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
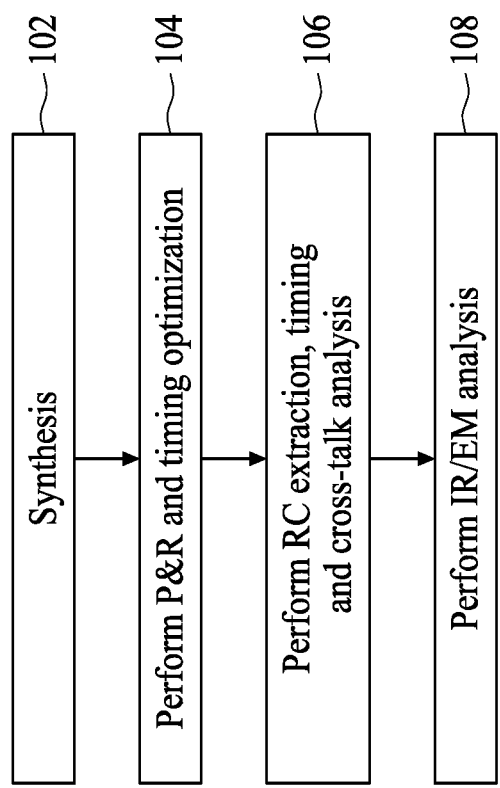
FIG. 1 illustrates an integrated circuit (IC) design method according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dicta a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Referring to FIG. 1, illustrated is an integrated circuit (IC) design method 100. The method 100 may be applicable to a standard cell library design. Any technology nodes may be possible and within the scope of this disclosure in general. For example, in some embodiments, the standard cell library design may be of 45 nanometers (N45) standard cell library design.

In operation 102, synthesis (e.g., register transfer level (RTL) synthesis or logic synthesis) is performed on a design (RTL design) to provide a netlist associated with the standard cell library. In operation 102, a predicted post-layout timing result is generated for the specified standard cell library. To produce the gate level netlist and predicted tinning result, a designer may use a standard cell library kits (e.g., front end libraries) associated with a standard cell library including cells such as I/O cells, SRAM cells, IP cells, and/or other circuit components known in the art.

The method 100 then proceeds to operation 104 where place and route (P&R) procedures are provided and timing is optimized. The operation 104 produces the gate level netlist in a chip layout form. To provide the layout, the designer may use the cell library described above with reference to operation 102 and P&R technology files.

Next, the method 100 proceeds to operation 106 where RC extraction, timing analysis and/or signal integrity (SI) closure are performed. A technology file (e.g., RC tech file) may be used to perform the extraction.

Subsequently, the method 100 proceeds to operation 108 where voltage (IR) drop, and/or electro-migration (EM) analysis and results are obtained.

EM generally refers to dislodging of ions from a metal wire (connecting nodes in an IC) and is caused when current density (the magnitude of current flow divided by the width of the metal) exceeds a threshold. EM impedes the ability of metal to conduct, and leads to reduced life-time as well. Therefore, it is generally desirable to ensure that current density does not exceed a predetermined threshold or is kept below the predetermined threshold at least by a substantial amount. Further, it may be desirable to ensure that an IC design can be analyzed for EM migration.

Voltage or ER drop generally refers to a difference of a voltage level from a supply voltage (e.g., Vdd) at a node of interest and is usually caused by the resistance (either due to parasitic resistance or due to other components in the path) present between a voltage source (providing the supply voltage) and the node of interest. As a result, circuit component(s) which are connected to nodes (other than the supply voltage nodes) may receive a terminal voltage, which is smaller than the supply voltage. If the terminal voltage is smaller than a corresponding permissible threshold, the circuit components may not operate in a desired manner. For example, a circuit may become non-operational or operate at a relatively low frequency (compared to a desired optimal frequency). Therefore, it may be desirable to perform voltage drop analysis to ensure that various nodes of interest receive at least their respective threshold voltages.

In the embodiment, sink current distribution information close to the real case with respect to at least one power/ground (P/G) rail sets is employed to generate IR/EM analysis results. The sink current distribution information will be described in detail as follows.

Generally, a standardized cell from a cell library is used. The standardized cell has either a cell height equal to the height of other cells in the same cell row, or has a cell height that is a multiple of a standard cell height. The cell height is defined as a distance between an upper cell boundary and a lower cell boundary. A cell having a single cell height is normally engaged to a single P/G rail set. In contrast, a cell having a cell height that is a multiple of the standard cell height is engaged to more than one P/G rail sets.

For example, a cell having a cell height that is two times of the standard cell height may correspond to two P/G rail sets in some embodiments. The upper portion of the cell having twice the standard cell height may correspond to a first P/G rail set, and the lower portion of the cell having twice the standard cell height may correspond to a second P/G rail set. In some embodiments, a cell having a cell height that is three times of the standard cell height may correspond to three P/G rail sets in some embodiments. The upper portion of the cell having thrice the standard cell height may correspond to a first P/G rail set, the middle portion of the cell having thrice the standard cell height may correspond to a second P/G rail set, and the lower portion of the cell having thrice the standard cell height may correspond to a third P/G rail set.

Figure 2:
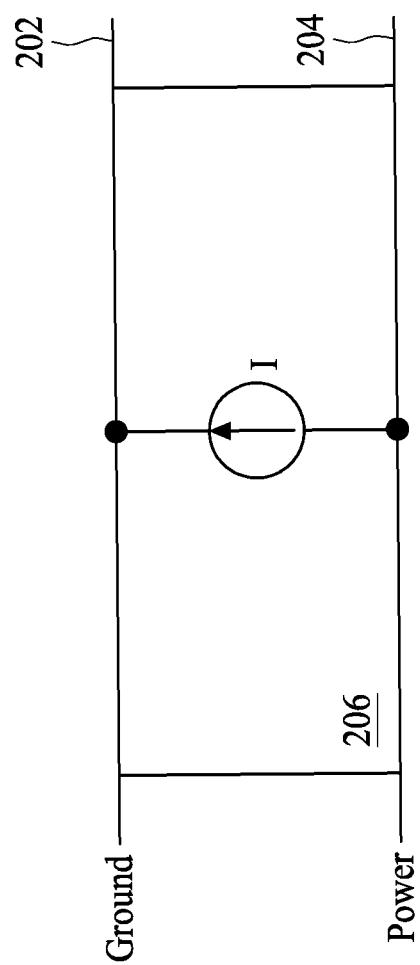
FIG. 2 is a schematic top view illustrating a cell having a single cell height in accordance with an embodiment of the present disclosure.

FIG. 2 is a schematic top view illustrating a cell having a single cell height in accordance with an embodiment of the present disclosure. Referring to FIG. 2, a ground rail 202 extends substantially in parallel to a power rail 204 while other orientations and arrangements may be used in other embodiments. As illustrated in FIG. 2, the power rail 204 and the ground rail 202, vertically separated from each other on a plane of an integrated circuit, are situated above the illustrated cell 206. The power rail 204 and the ground rail 202 may be electrically coupled to external sources, i.e. a power source and a ground node. The power rail 204 and the ground rail 202 may be formed of a conductive material.

In this embodiment, the cell 206 has a single cell height, i.e. the standard cell height. As can be seen from a top view, an upper cell boundary of the cell 206 corresponds to the ground rail 202, and a lower cell boundary of the cell 206 corresponds to the power rail 204. The IR/EM analysis results are estimated based on a sink current I flowing from the power rail 204 to the ground rail 202.

Figure 3:
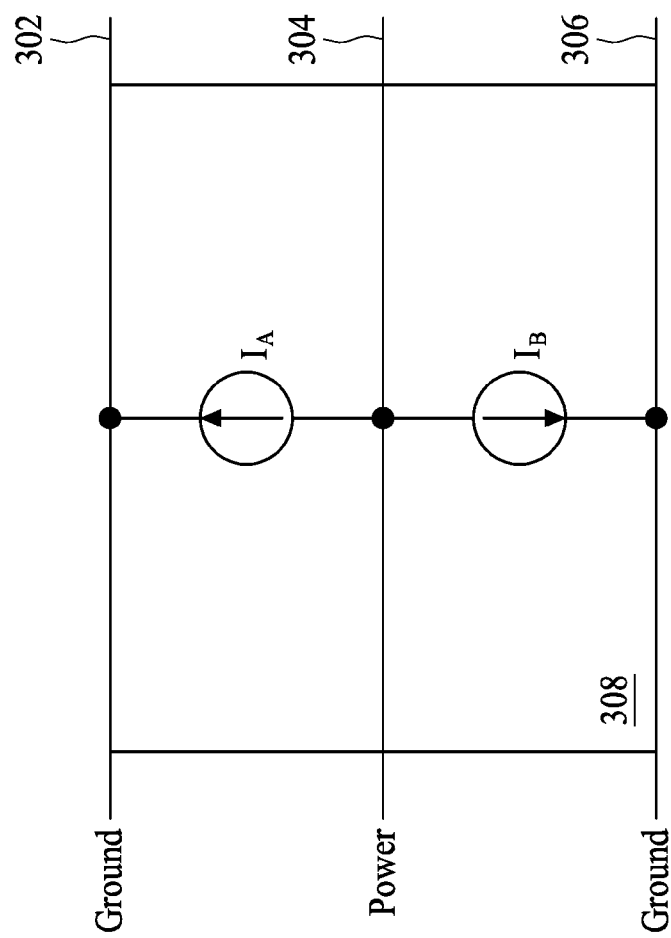
FIG. 3 is a schematic top view illustrating a cell having a double cell height in accordance with an embodiment of the present disclosure.

FIG. 3 is a schematic top view illustrating a cell having a double cell height in accordance with an embodiment of the present disclosure. Referring to FIG. 3, an upper ground rail 302 extends substantially in parallel to a power rail 304 and a lower ground rail 306 while other orientations and arrangements may be used in other embodiments. As illustrated most clearly in FIG. 3, the power rail 304 and the upper ground rail 302, vertically separated from each other on a plane of an integrated circuit, are situated above the illustrated cell 308. In addition, the power rail 304 and the lower ground rail 306, vertically separated from each other on a plane of an integrated circuit, are situated above the illustrated cell 308 as well. The power rail 304, the upper ground rail 302 and the lower ground rail 306 may be electrically coupled to external sources, i.e. a power source and a ground node. The power rail 304, the upper ground rail 302 and the lower ground rail 306 may be formed of a conductive material.

In this embodiment, the cell 308 has a cell height that is two times of the standard cell height. As can be seen from a top view, an upper cell boundary of the cell 308 corresponds to the upper ground rail 302, and a lower cell boundary of the cell 308 corresponds to the lower power rail 306. The IR/EM analysis results are estimated based on an upper sink current $I_A$ and a lower sink current $I_B$. The upper sink current $I_A$ flows from the power rail 304 to the upper ground rail 302, and the lower sink current $I_B$ flows from the power rail 304 to the lower ground rail 306. In existing methods, the upper sink current $I_A$ and the lower sink current $I_B$ are assumed to be equal when estimating the IR/EM analysis results. For example, a total sink current $I_T$ of the cell 308 is obtained and equally separated into two portions for the upper sink current $I_A$ and the lower sink current $I_B$.

However, the assumption of the evenly distributed sink currents in all the P/G rail sets may not be practical and therefore may incur significant errors in the subsequent IR/EM analysis. As such, the approach of evenly distributing sink currents in all the P/G rail sets is no longer applicable especially when highly accurate analysis results are required. More precise sink current distribution information with respect to all the rail sets is employed for IR/EM analysis in the present disclosure, so as to improve accuracy of the IR/EM result during power signoff in particular when the chip includes multi-height cells.

In some embodiments, a slew-load table generated or populated based on the simulation results may be used to estimate the sink current distribution in the P/G rail sets. The data stored in the slew-load table defines one or more relationships between the input and output parameters and the timing delays caused by such input and output parameters. For example, for each pair of a slew rate value and a loading value, one or more timing delays caused by the pair of slew rate and loading values in one or more corresponding signal paths of the semiconductor circuit may be included. When using the slew-load table to estimate the sink current distribution in P/G rail sets, more than one outcome may be obtained due to the combinations of input signal values. In some embodiments, the most extreme outcome may be employed in order to estimate the worst case for the IR/EM analysis.

Figure 4:
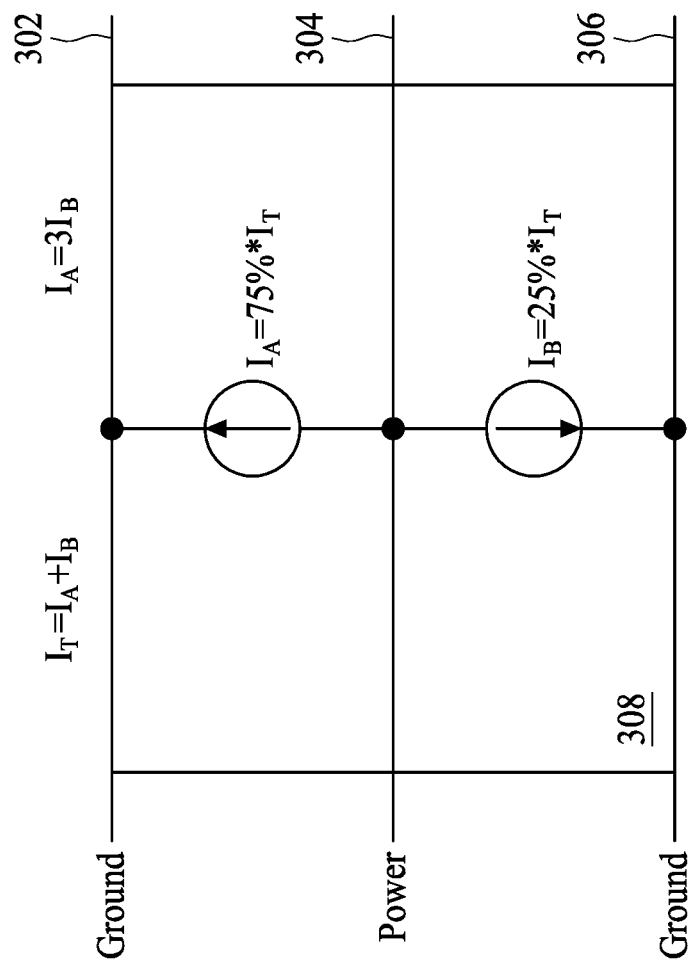
FIG. 4 is a schematic top view illustrating a sink current distribution for a cell having a double cell height in accordance with an embodiment of the present disclosure.

FIG. 4 is a schematic top view illustrating a sink current distribution for a cell having a double cell height in accordance with an embodiment of the present disclosure. In the embodiment, the upper sink current $I_A$ flowing through the upper portion of the cell 308 is three times larger than the the lower sink current $I_B$ flowing through the lower portion of the cell 308. Therefore, the upper sink current $I_A$=75%*the total sink current $I_T$; and the lower sink current $I_B$=25%*the total sink current $I_T$. The sink current distribution information obtained above is additionally provided to step 108 of the method 100 to produce accurate IR/EM analysis results.

Figure 5:
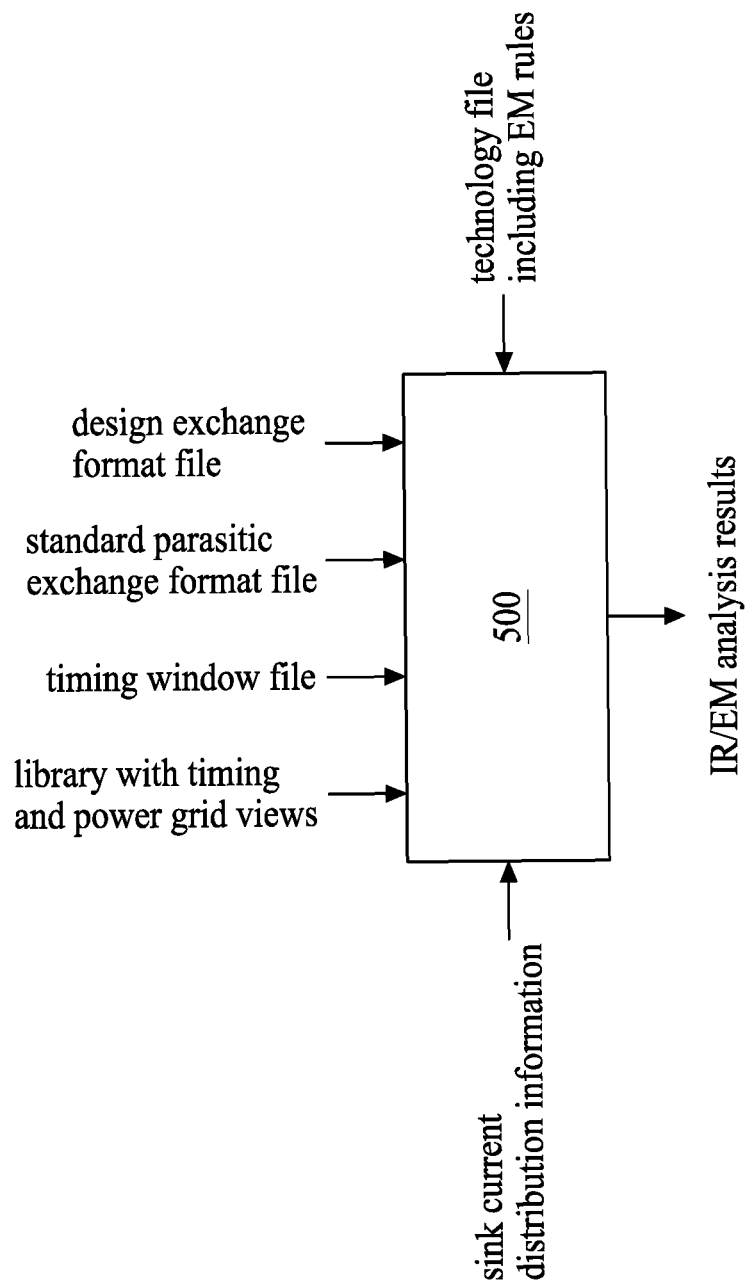
FIG. 5 is a diagram illustrating an EDA tool for generating IR/EM analysis results according to an embodiment of the present disclosure.

FIG. 5 is a diagram illustrating an EDA tool for generating IR/EM analysis results according to an embodiment of the present disclosure. The EDA tool 500 may be configured to generate the IR/EM analysis results using a sink current distribution information, a library with timing and power grid views, a timing window file (TWF), a standard parasitic exchange format (SPEF) file, a design exchange format (DEF) file and a technology file including EM rules. The timing window file may be generated by the timing analysis performed during timing analysis, and the timing window file may include a slew/delay time of output switching for each logic cell in the netlist of the integrated circuit. The standard parasitic exchange format file may contain resistance and capacitance components of wirings. The definition file may be used for layout verification.

Figure 6:
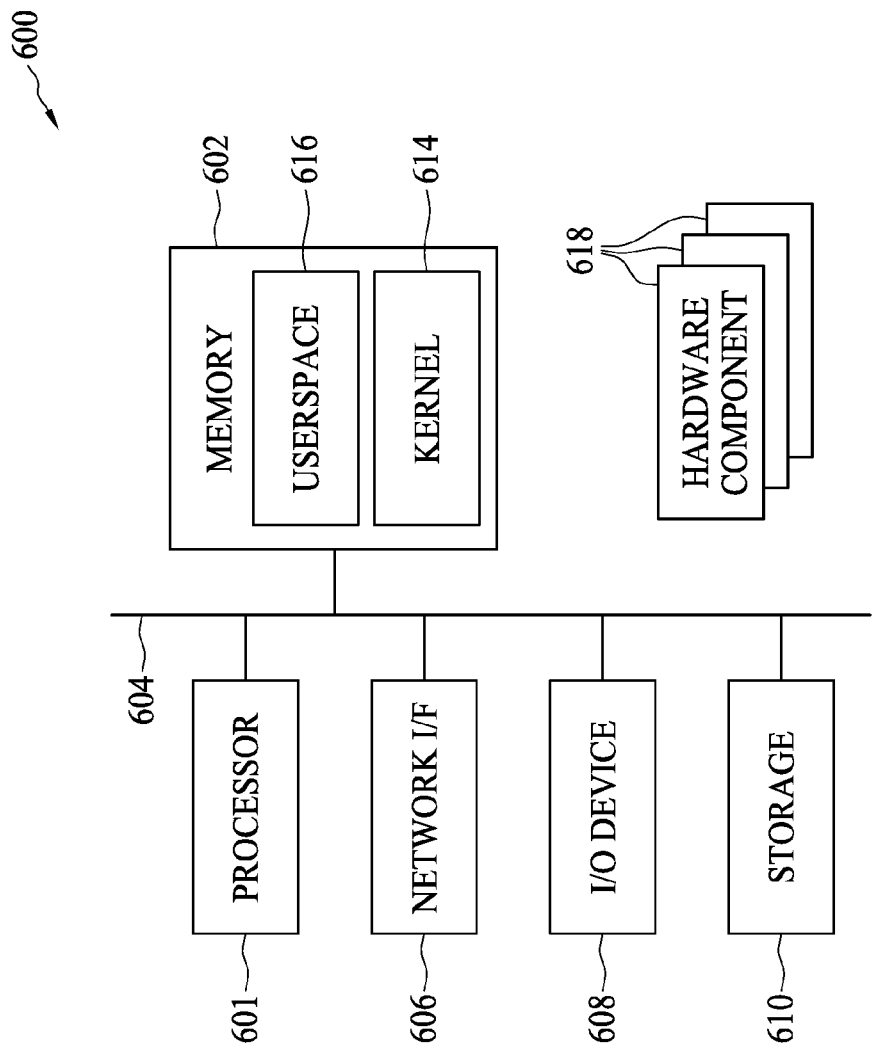
FIG. 6 is a block diagram of a computer system in accordance with some embodiments.

FIG. 6 is a block diagram of a computer system 600 in accordance with some embodiments. One or more of the tools and/or systems and/or operations described with respect to FIGS. 1 and 5 may be realized in some embodiments by one or more computer systems 600 of FIG. 6. The system 600 may include a processor 601, a memory 602, a network interface (I/F) 606, a storage 610, an input/output (I/O) device 608, and one or more hardware components 618 communicatively coupled via a bus 604 or other interconnection communication mechanism.

The memory 602 may include, in some embodiments, a random access memory (RAM) and/or other dynamic storage device and/or read only memory (ROM) and/or other static storage device, coupled to the bus 604 for storing data and/or instructions to be executed by the processor 601, e.g., kernel 614, user space 616, portions of the kernel and/or the user space, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, user space 616, etc. The I/O device 608 may include an input device, an output device and/or a combined input/output device for enabling user interaction with the system 600. An input device may include, for example, a keyboard, keypad, mouse, trackball, trackpad, and/or cursor direction keys for communicating information and commands to the processor 601. An output device may include, for example, a display, a printer, a voice synthesizer, etc. for communicating information to a user.

In some embodiments, one or more operations and/or functionality of the tools and/or systems described with respect to FIGS. 1 and 5 may be realized by the processor 601, which is programmed for performing such operations and/or functionality. One or more of the memory 602, the I/F 606, the storage 310, the I/O device 608, the hardware components 618, and the bus 604 is/are operable to receive instructions, data, design rules, netlists, layouts, models and/or other parameters for processing by the processor 601.

In some embodiments, one or more of the operations and/or functionality of the tools and/or systems described with respect to FIGS. 1 and 5 may be implemented by specifically configured hardware (e.g., by one or more application specific integrated circuits or ASIC(s)) which is/are included) separate from or in lieu of the processor 601. Some embodiments incorporate more than one of the described operations and/or functionality in a single ASIC.

In some embodiments, the operations and/or functionality may be realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include exemplary operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

Some embodiments of the present disclosure provide an integrated circuit (IC) design method, includes: using a computer to perform synthesis upon a register transfer level (RTL) IC design to generate a gate level netlist; performing place and route (P&R) upon the gate level netlist to generate a layout; determining a sink current distribution information of the layout; and generating a voltage (IR) drop/electro-migration (EM) analysis result of the layout according to the sink current distribution information; wherein the layout includes a cell having a cell height that is N times higher than a single cell height, where N is an integer and greater than 1, and the cell corresponds to N power/ground (P/G) rail sets; wherein the sink current distribution information includes a proportion of a sink current flowing through each of the N power/ground (P/G) rail sets with respect to the cell when operated.

Some embodiments of the present disclosure provide an integrated circuit (IC) design method, includes: determining a sink current distribution information of a layout by using a computer; and generating a voltage (IR) drop/electro-migration (EM) analysis result of the layout according to the sink current distribution information; wherein the layout includes a cell having a cell height that is N times higher than a single cell height, where N is an integer and greater than 1, and the cell corresponds to N power/ground (P/G) rail sets; wherein the sink current distribution information includes a proportion of a sink current flowing through each of the N power/ground (P/G) rail sets with respect to the cell when operated.

Some embodiments of the present disclosure provide a non-transitory computer-readable medium containing therein instructions which, when executed by a computer, cause the computer to perform the actions including: generating a gate level netlist by using a computer to perform synthesis upon a register transfer level (RTL) integrated circuit (IC) design; performing place and route (P&R) upon the gate level netlist to generate a layout; determining a sink current distribution information of the layout; and generating a voltage (IR) drop/electro-migration (EM) analysis result of the layout according to the sink current distribution information; wherein the layout includes a cell having a cell height that is N times higher than a single cell height, where N is an integer and greater than 1, and the cell corresponds to N power/ground (P/G) rail sets; wherein the sink current distribution information includes a proportion of a sink current flowing through each of the N power/ground (P/G) rail sets with respect to the cell when operated.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit (IC) design method, comprising:
    using a computer to perform synthesis upon a register transfer level (RTL) IC design to generate a gate level netlist;
    performing place and route (P&R) upon the gate level netlist to generate a layout of the IC design;
    determining a sink current distribution information of the layout of the IC design;
    generating a voltage (IR) drop/electro-migration (EM) analysis result of the layout of the IC design according to the sink current distribution information;
    determining whether a current density of the layout of the IC design exceeds a predetermined threshold according to the IR/EM analysis result;
    determining whether a voltage received by a node of the layout of the IC design exceeds a predetermined threshold voltage according to the IR/EM analysis result; and
    when the current density of the layout of the IC design does not exceed the predetermined threshold and the voltage received by the node of the layout of the IC design exceeds the predetermined threshold voltage, causing the IC design to be fabricated based on the layout of the IC design;
    wherein the layout of the IC design includes a cell having a cell height that is N times higher than a single cell height, where N is an integer and greater than 1, and the cell corresponds to N power/ground (P/G) rail sets;
    wherein the sink current distribution information includes a proportion of a sink current flowing through each of the N power/ground (P/G) rail sets with respect to the cell when operated.

2. The method of claim 1, wherein the generation of the gate level netlist comprises:
    generating the gate level netlist by using a standard cell library.

3. The method of claim 1, wherein the determination of the sink current distribution information comprises:
    generating a slew-load table for the cell; and
    determining the sink current distribution information according to the slew-load table.

4. The method of claim 3, wherein the determination of the sink current distribution information according to the slew-load table comprises:
    when more than one possibility of the proportion of the sink current flowing through each of the N P/G rail sets with respect to the cell is obtained, determining the sink current distribution information according to the most extreme proportion of the sink current flowing through each of the N P/G rail sets with respect to the cell.

5. The method of claim 1, wherein the generation of the IR/EM analysis result of the layout of the IC design further comprises:
    generating the IR/EM analysis result of the layout of the IC design according to a library with timing and power grid views.

6. The method of claim 1, wherein the generation of the IR/EM analysis result of the layout of the IC design further comprises:
    generating the IR/EM analysis result of the layout of the IC design according to a timing window file.

7. The method of claim 1, wherein the generation of the IR/EM analysis result of the layout of the IC design further comprises:
    generating the IR/EM analysis result of the layout of the IC design according to a standard parasitic exchange format file.

8. The method of claim 1, wherein the generation of the IR/EM analysis result of the layout of the IC design further comprises:
    generating the IR/EM analysis result of the layout of the IC design according to a technology file including EM rules.

9. An integrated circuit (IC) design method, comprising:
    determining a sink current distribution information of a layout of the IC design by using a computer;
    generating a voltage (IR) drop/electro-migration (EM) analysis result of the layout of the IC design according to the sink current distribution information;
    determining whether a current density of the layout of the IC design exceeds a predetermined threshold according to the IR/EM analysis result;
    determining whether a voltage received by a node of the layout of the IC design exceeds a predetermined threshold voltage according to the IR/EM analysis result; and
    when the current density of the layout of the IC design does not exceed the predetermined threshold and the voltage received by the node of the layout of the IC design exceeds the threshold voltage, causing the IC design to be fabricated based on the layout of the IC design;
    wherein the layout of the IC design includes a cell having a cell height that is N times higher than a single cell height, where N is an integer and greater than 1, and the cell corresponds to N power/ground (P/G) rail sets;
    wherein the sink current distribution information includes a proportion of a sink current flowing through each of the N power/ground (P/G) rail sets with respect to the cell when operated.

10. The method of claim 9, wherein the cell is obtained from a standard cell library.

11. The method of claim 9, wherein the determination of the sink current distribution information comprises:

generating a slew-load table for the cell; and
determining the sink current distribution information according to the slew-load table.

12. The method of claim 11, wherein the determination of the sink current distribution information according to the slew-load table comprises:
when more than one possibility of the proportion of the sink current flowing through each of the N P/G rail sets with respect to the cell is obtained, determining the sink current distribution information according to the most extreme proportion of the sink current flowing through each of the N P/G rail sets with respect to the cell.

13. A non-transitory computer-readable medium containing therein instructions which, when executed by a computer, cause the computer to perform the actions comprising:
performing synthesis upon a register transfer level (RTL) integrated circuit (IC) design to generate a gate level netlist;
performing place and route (P&R) upon the gate level netlist to generate a layout of the IC design;
determining a sink current distribution information of the layout of the IC design;
generating a voltage (IR) drop/electro-migration (EM) analysis result of the layout of the IC design according to the sink current distribution information;
determining whether a current density of the layout of the IC design exceeds a predetermined threshold according to the IR/EM analysis result;
determining whether a voltage received by a node of the layout of the IC design exceeds a predetermined threshold voltage according to the IR/EM analysis result; and
when the current density of the layout of the IC design does not exceed the predetermined threshold and the voltage received by the node of the layout of the IC design exceeds the predetermined threshold voltage, causing the IC design to be fabricated based on the layout of the IC design;
wherein the layout of the IC design includes a cell having a cell height that is N times higher than a single cell height, where N is an integer and greater than 1, and the cell corresponds to N power/ground (P/G) rail sets;
wherein the sink current distribution information includes a proportion of a sink current flowing through each of the N power/ground (P/G) rail sets with respect to the cell when operated.

14. The non-transitory computer-readable medium of claim 13, wherein the generation of the gate level netlist comprises:
generating the gate level netlist by using a standard cell library.

15. The non-transitory computer-readable medium of claim 13, wherein the determination of the sink current distribution information comprises:
generating a slew-load table for the cell; and
determining the sink current distribution information according to the slew-load table.

16. The non-transitory computer-readable medium of claim 15, wherein the determination of the sink current distribution information according to the slew-load table comprises:
when more than one possibility of the proportion of the sink current flowing through each of the N P/G rail sets with respect to the cell is obtained, determining the sink current distribution information according to the most extreme proportion of the sink current flowing through each of the N P/G rail sets with respect to the cell.

17. The non-transitory computer-readable medium of claim 13, wherein the generation of the IR/EM analysis result of the layout of the IC design further comprises:
generating the IR/EM analysis result of the layout of the IC design according to a library with timing and power grid views.

18. The non-transitory computer-readable medium of claim 13, wherein the generation of the IR/EM analysis result of the layout of the IC design further comprises:
generating the IR/EM analysis result of the layout of the IC design according to a timing window file.

19. The non-transitory computer-readable medium of claim 13, wherein the generation of the IR/EM analysis result of the layout of the IC design further comprises:
generating the IR/EM analysis result of the layout of the IC design according to a standard parasitic exchange format file.

20. The non-transitory computer-readable medium of claim 13, wherein the generation of the IR/EM analysis result of the layout of the IC design further comprises:
generating the IR/EM analysis result of the layout of the IC design according to a technology file including EM rules.

* * * * *